United States Patent [19]
Villa

[11] Patent Number: 5,087,357
[45] Date of Patent: Feb. 11, 1992

[54] AQUARIUM FILTER APPARATUS

[76] Inventor: Aquilino L. Villa, 1024 Crest Rd., Pine Hill, N.J. 08021

[21] Appl. No.: 578,684

[22] Filed: Sep. 7, 1990

[51] Int. Cl.$^5$ ............................................. A01K 63/04
[52] U.S. Cl. .................... 210/169; 210/416.2; 210/266; 210/284; 210/282; 119/5
[58] Field of Search ...................... 210/169, 416.2, 266, 210/282, 284; 119/5

[56] References Cited

U.S. PATENT DOCUMENTS

| | | | |
|---|---|---|---|
| 2,674,574 | 4/1954 | Pettas | 210/169 |
| 2,676,921 | 4/1954 | Vansteenkiste | 119/5 |
| 3,151,069 | 9/1964 | Halpert | 210/169 |
| 3,292,792 | 12/1966 | Falkenberg et al. | 210/169 |
| 3,313,421 | 4/1967 | Falkenberg et al. | 210/169 |
| 3,371,789 | 3/1968 | Hense et al. | 210/169 |
| 4,802,980 | 2/1989 | Gilkey et al. | 210/169 |
| 4,820,410 | 4/1989 | Cavalcante | 210/169 |

Primary Examiner—Stanley S. Silverman
Assistant Examiner—Robert James Popovics
Attorney, Agent, or Firm—Leon Gilden

[57] ABSTRACT

An apparatus is set forth permitting unitary replacement of the filtration components contained therewithin, wherein an elongate cylindrical housing includes a lowermost filtration polymeric fibrous member underlying a coaxially aligned replenishable mesh bag containing ammonia activated charcoal therewithin. Upper and lower end caps are replaceably mounted relative to a central coaxially aligned body to permit replacement of the components therewithin. A modification of the invention includes additional components of sand and gravel replacement bags at upper and lower ends positioned respectively within the body to permit tailoring of a filtration in response to aquarium needs.

1 Claim, 4 Drawing Sheets

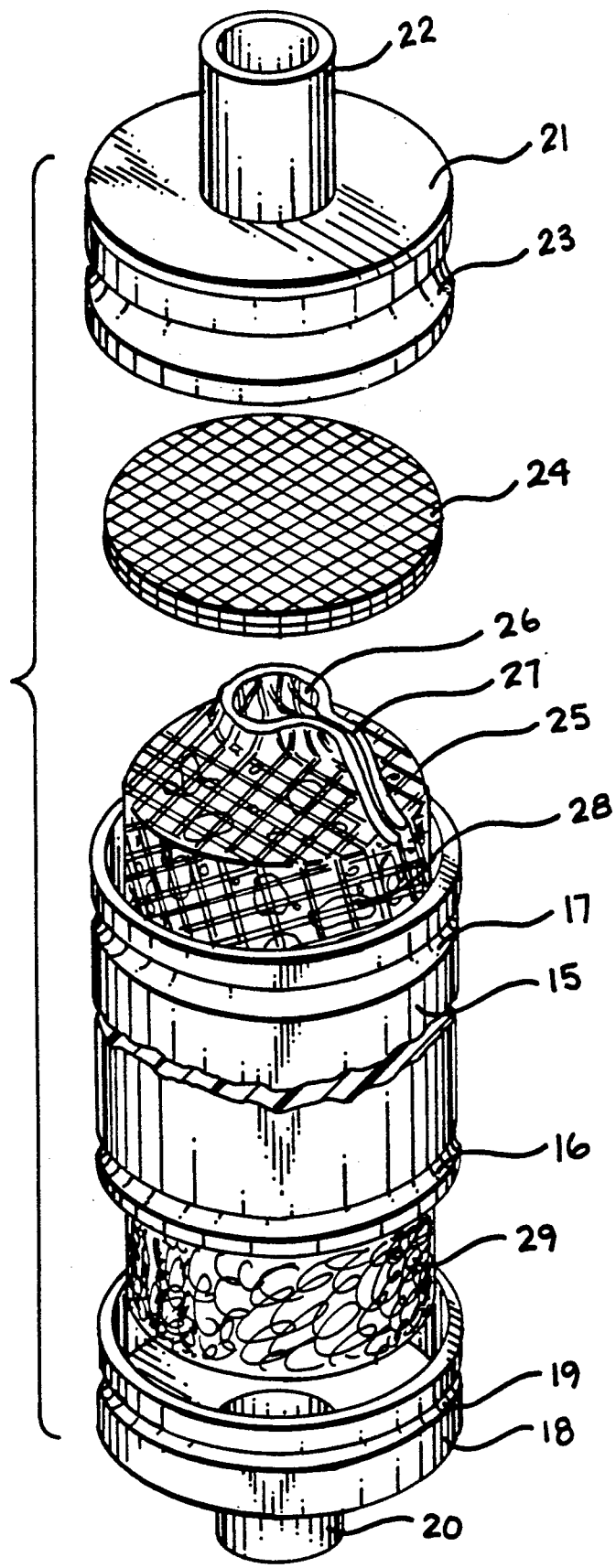

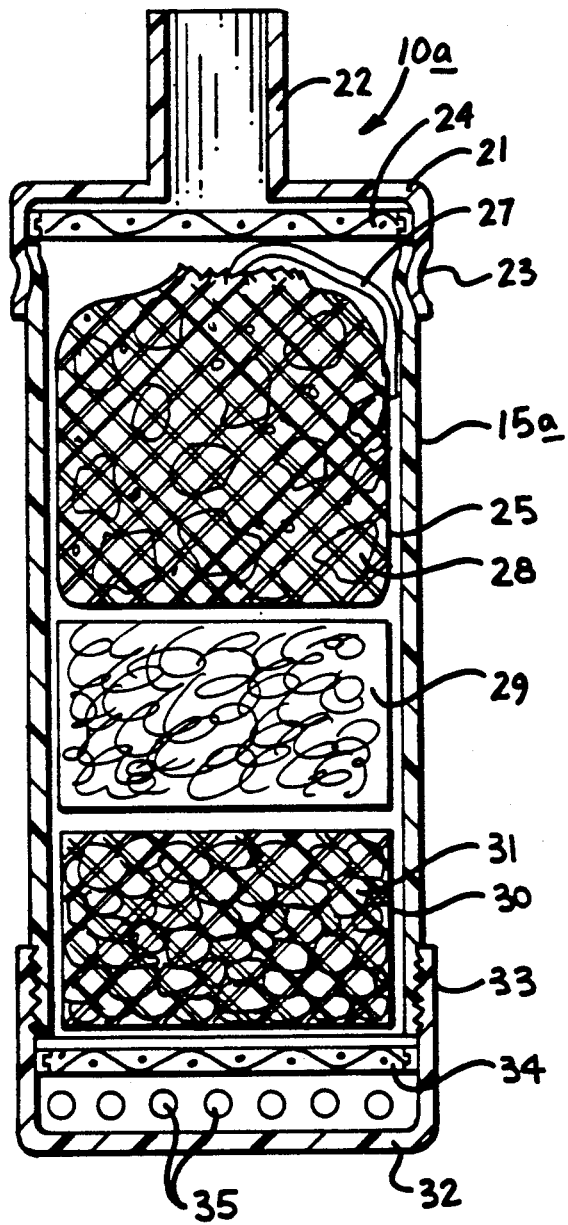
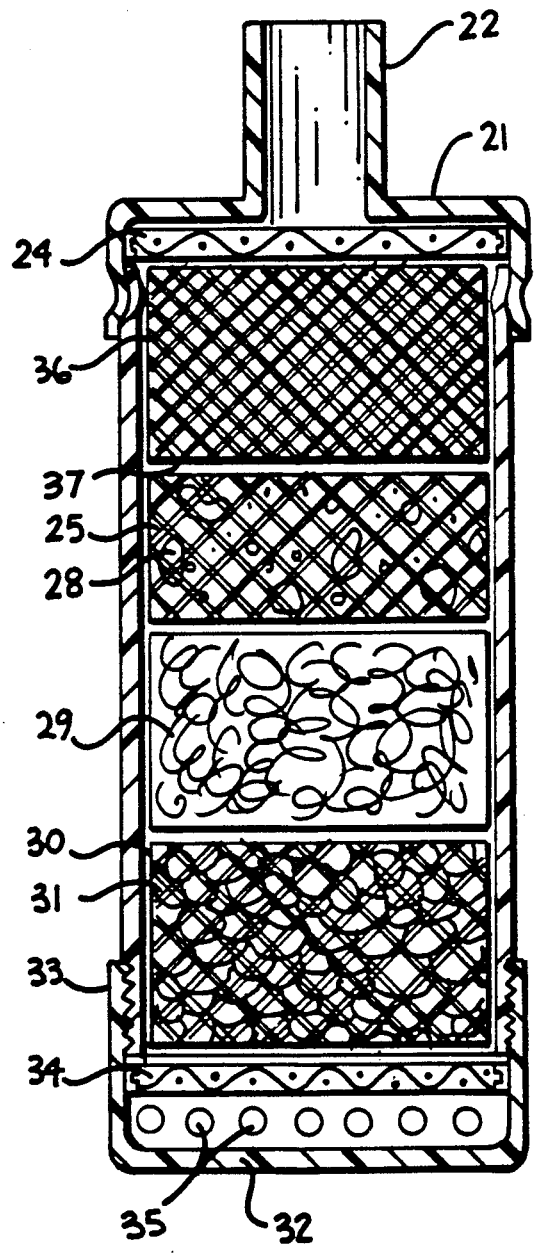

ns of the appended claims forming a part of this disclosure.

AQUARIUM FILTER APPARATUS

BACKGROUND OF THE INVENTION

1. Field of the Invention

The field of invention relates to filtration apparatus, and more particularly pertains to a new and improved aquarium filter apparatus wherein the same permits selective replenishment and replacement of various components within the filter organization.

2. Description of the Prior Art

Filtration of aquarium organizations is well known in the prior art. Heretofore such organizations have typically utilized sealed components or components loosely contained within various compartments within a housing. The instant invention attempts to overcome deficiencies of the prior art by providing a filtration organization permitting enhanced filtration and permitting such filtration tailored to individual aquarium requirements. Examples of the prior art include U.S. Pat. No. 4,802,980 providing an elongate filter organization including a fibrous material and charcoal contained therewithin for filtration.

U.S. Pat. No. 4,783,258 to Willinger sets forth a filter container wherein biological filtration of the water is provided by the use of a replaceable filter plate contained within a housing.

U.S. Pat. No. 4,725,353 to Whitman sets forth an aquarium cleaning arrangement utilizing a below-gravel filtration system.

U.S. Pat. No. 4,820,410 to Cavalcande sets forth a filter organization utilizing various filter chambers within the organization in use.

U.S. Pat. No. 4,842,727 to Willinger provides for an aquarium filter including a housing arranged for mounting to a side wall of an associated aquarium.

As such, it may be appreciated that there continues to be a need for a new and improved aquarium filter apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of filter apparatus now present in the prior art, the present invention provides an aquarium filter apparatus wherein the same utilizes an elongate longitudinally aligned filter housing permitting unitary replacement of various components therewithin. As such, the general purpose of the present invention, which will be described subsequently in greater detail, is to provide a new and improved aquarium filter apparatus which has all the advantages of the prior art filter apparatus and none of the disadvantages.

To attain this, the present invention provides an apparatus with a unitary replacement filtration system contained therewithin, wherein an elongate cylindrical housing includes a lowermost filtration polymeric fibrous member underlying a coaxially aligned replenishable mesh bag containing ammonia activated charcoal therewithin. Upper and lower end caps are replaceably mounted relative to a central coaxially aligned body to permit replacement of the components therewithin. A modification of the invention includes additional components of sand and gravel replacement bags at upper and lower ends positioned respectively within the body to permit tailoring of a filtration in response to aquarium needs.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved aquarium filter apparatus which has all the advantages of the prior art filter apparatus and none of the disadvantages.

It is another object of the present invention to provide a new and improved aquarium filter apparatus which may be easily and efficiently manufactured and marketed.

It is a further object of the present invention to provide a new and improved aquarium filter apparatus which is of a durable and reliable construction.

An even further object of the present invention is to provide a new and improved aquarium filter apparatus which is susceptible of a low cost of manufacture with regard to both materials and labor, and which accordingly is then susceptible of low prices of sale to the consuming public, thereby making such aquarium filter apparatus economically available to the buying public.

Still yet another object of the present invention is to provide a new and improved aquarium filter apparatus which provides in the apparatuses and methods of the prior art some of the advantages thereof, while simultaneously overcoming some of the disadvantages normally associated therewith.

Still another object of the present invention is to provide a new and improved aquarium filter apparatus wherein the same utilizes an elongate longitudinally aligned filter housing permitting replacement and alignment of the components contained therewithin for filtration from an aquarium at a below-gravel orientation relative to the aquarium.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an isometric, exploded illustration of the instant invention.

FIG. 6 is an orthographic cross-sectional illustration of a modification of the instant invention.

FIG. 7 is an orthographic cross-sectional illustration of the modification of the instant invention utilizing a further array of aligned filtration components readily replaceable for maintenance and use.

DESCRIPTION OF THE PREFERRED EMBODIMENT

Figure 1:
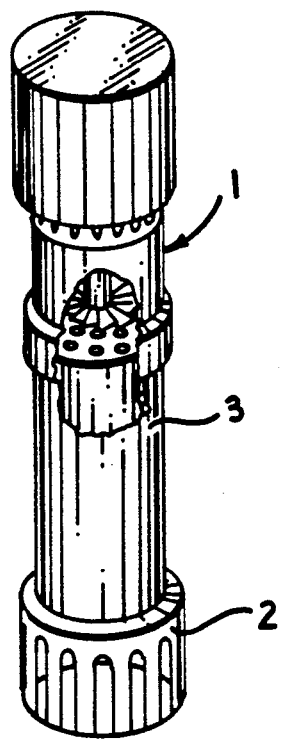
FIG. 1 is an isometric illustration of a prior art filter apparatus.

With reference now to the drawings, and in particular to FIGS. 1 to 7 thereof, a new and improved aquarium filter apparatus embodying the principles and concepts of the present invention and generally designated by the reference numerals 10 and 10a will be described.

Figure 2:
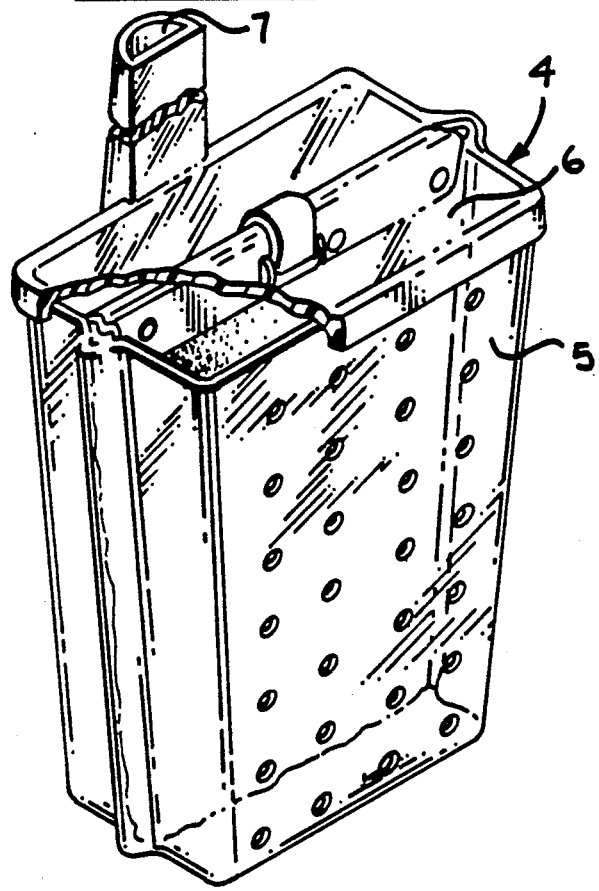
FIG. 2 is an isometric illustration of a further prior art aquarium filter apparatus.
Figure 3:
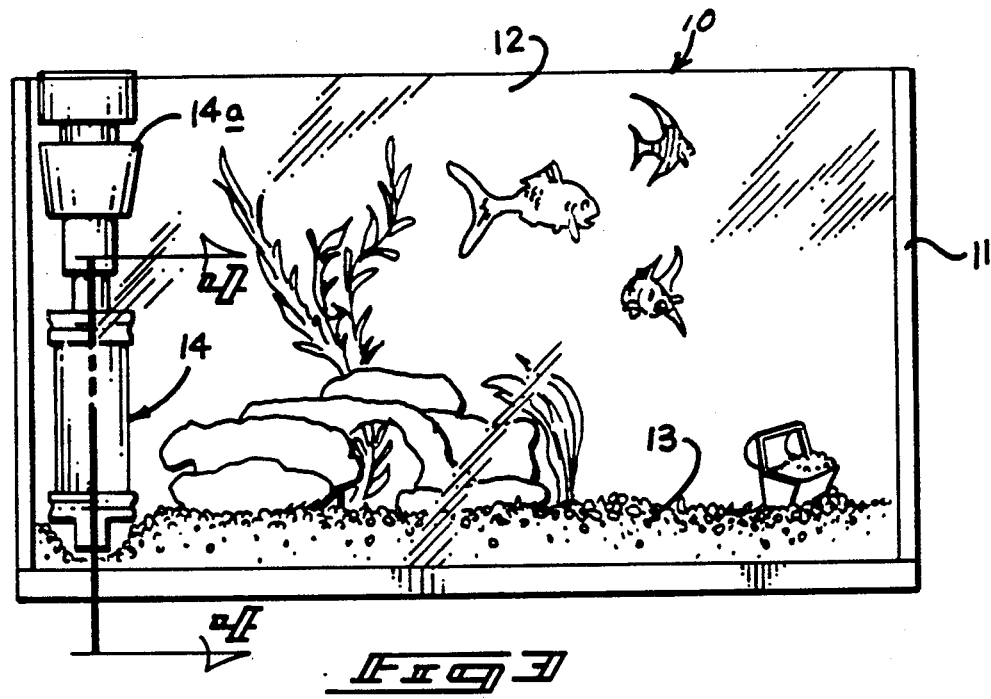
FIG. 3 is an orthographic side view, taken in elevation, of the instant invention.
Figure 4:
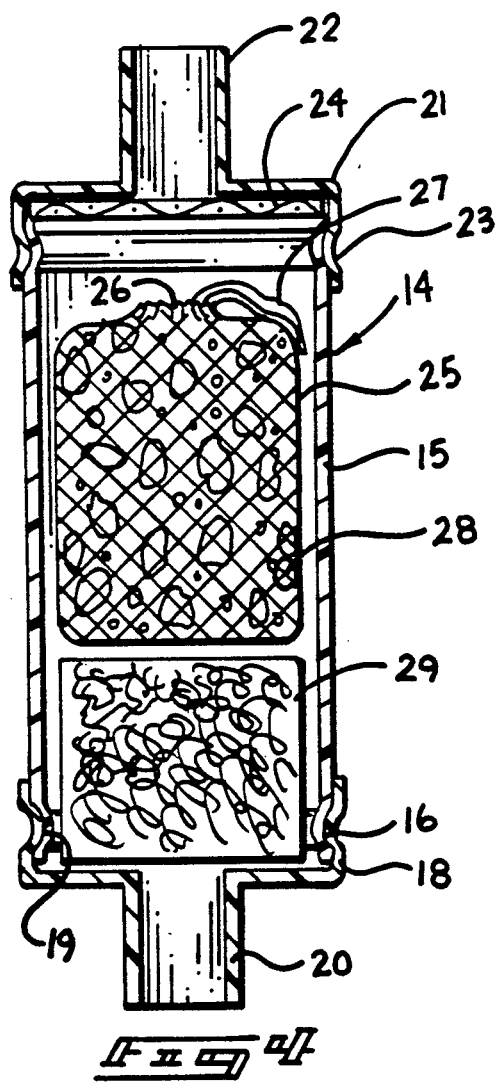
FIG. 4 is an orthographic cross-sectional view, taken along the lines 4—4 of FIG. 3, in the direction indicated by the arrows.

FIG. 1 illustrates a prior art filtration member as set forth in U.S. Pat. No. 4,802,980 utilizing a slided base member to permit entrance of water therewithin, with the prior art filter member 1 utilizing an elongate housing containing a fibrous and charcoal filtration organization therewithin. FIG. 2 illustrates a prior art filter organization as set forth in U.S. Pat. No. 4,783,258, wherein the filter housing 4 includes a forward apertured wall 5 to direct fluid therethrough and into filtration communication with a replacement filter plate 6 and direct such filtered fluid through an output conduit 7.

More specifically, the aquarium filter apparatus 10 of the instant invention essentially comprises a rigid framework 11 mounting transparent side walls 12 to define an aquarium, with a gravel strata 13 arranged about the floor of the aquarium. A filter member 14 is coupled to an overlying power header pump 14a, with a lowermost inlet conduit 20 of the filter member 14 arranged below a surface level of the gravel strata to enhance filtration of the organization by utilizing the gravel strata as a pre-filtration unit of the filter apparatus. The filter member includes a central tubular body 15, with a lower annular groove 16 circumferentially arranged adjacent a lower terminal end of the tubular body 15, and an annular upper groove 17 arranged adjacent an upper terminal end of the tubular body circumferentially thereabout. A bottom cap 18 includes an interiorly projecting lower annular rib 19 receivable within the lower groove 16, wherein the bottom cap 18 includes a coaxially aligned inlet conduit 20, as noted above. An upper cap 21 includes a coaxially aligned outlet conduit 22, with an internally projecting upper annular rib 23 receivable within the annular upper groove 17 to permit removal of the bottom cap 18 and the upper cap 21 as required to attain access to internal filtration components of the organization.

A mesh screen 24 is mounted within the upper cap 21 orthogonally arranged relative to an aligned axis of the tubular body 15 overlying the outlet conduit 22. A mesh bag member 25 including an upper opening 26, with a drawstring 27 to permit constricting of the opening 26 and closing of the mesh bag member 25 includes a predetermined quantity of ammonia activated charcoal 28 contained therewithin. A fibrous filter cylinder 29 is coaxially aligned with the tubular body and the mesh bag member 25 underlying the mesh bag member 25 and is typically formed of a polyester material.

FIG. 6 illustrates a modified filter apparatus member 10a, wherein the organization includes a lower mesh bag 30 coaxially aligned with and underlying the filter cylinder 29, with a predetermined quantity of gravel 31 contained therewithin. The lower lid 32 includes a lower lid internally threaded skirt 33 threadedly mounted to a lower terminal end of the modified tubular bodies 15a. A lower screen 34 coaxially positioned orthogonally relative to an axis of the tubular body is fixedly mounted within the skirt 33 overlying circumferentially arranged inlet openings 35 directed through the lower lid 32 adjacent the lower terminal end thereof to require initial directing of fluid through the inlet openings 35 and the lower screen 34 prior to its being directed through the tubular body and the various filtration components. FIG. 7 illustrates the further use of the organization with an upper mesh bag 36 positioned between the mesh screen 24 and the mesh bag member 25, with the upper mesh bag 36 including a predetermined quantity of sand filling the upper mesh bag 36 to define a cylinder coaxially aligned with the tubular body, wherein the sand 37 within the mesh bag 36 provides a final filtration of fine particulates that have been passed through the underlying filtration components in use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An aquarium filter apparatus, the apparatus in combination with an aquarium, including transparent side walls and a gravel strata, the gravel strata including a top surface, with a filter member, the filter member including inlet conduit means positioned below the top surface, and
- an outlet conduit, with the outlet conduit operably associated with a pump member to direct fluid flow through the filter member, and
- wherein the filter member includes a central tubular body, the central tubular body including a lower lid, the lower lid including the inlet conduit means mounted thereto, and an upper cap including the outlet conduit, with the upper cap and the lower lid coaxially aligned relative to the tubular body, and the lower lid mounted to a lower terminal end of the tubular body, and the upper cap mounted to an upper end of the tubular body, and
- wherein the tubular body includes an upper annular groove, and the upper cap including an interiorly projecting lower annular rib, the lower annular rib selectively receivable within the upper groove for securement of the upper cap to the tubular body, and
- including a mesh screen mounted within the upper cap overlying the outlet conduit, and the mesh screen orthogonally oriented relative to an access defined by the tubular body, and
- including a mesh bag member, the mesh bag member including an opening, the opening including a drawstring mounted about the opening to effect selective closure of the opening, with the mesh bag member including a predetermined quantity of ammonia activated charcoal, and the mesh bag member defining a cylinder coaxially aligned within the tubular body, and
- including a fibrous filter cylinder coaxially aligned within the tubular body adjacent to and underlying the mesh bag member, and
- including an upper mesh bag overlying the mesh bag member, wherein the upper mesh bag defines an upper mesh bag cylinder and includes granular sand, with the upper mesh bag member positioned between the mesh bag member and the mesh screen, and
- including a lower mesh bag, the lower mesh bag defining a lower mesh bag cylinder and including gravel contained therewithin, with the lower mesh bag underlying the fibrous filter cylinder and positioned adjacent thereto in coaxial alignment with the tubular body, and
- wherein the lower lid includes an annular array of inlet openings circumferentially arranged through the lower lid adjacent a lower terminal end of the lower lid, with the inlet openings radially arranged relative to the axis of the tubular body, and
- including a lower mesh screen, the lower mesh screen overlying the inlet openings and positioned between the inlet openings and the lower mesh bag, and
- wherein the lower lid includes an internally threaded annular skirt threadedly mounted to the lower terminal end of the tubular body.

* * * * *